S. S. SMICK.
Grave-Shield and Body-Protector.
No. 209,932.
Patented Nov. 12, 1878.
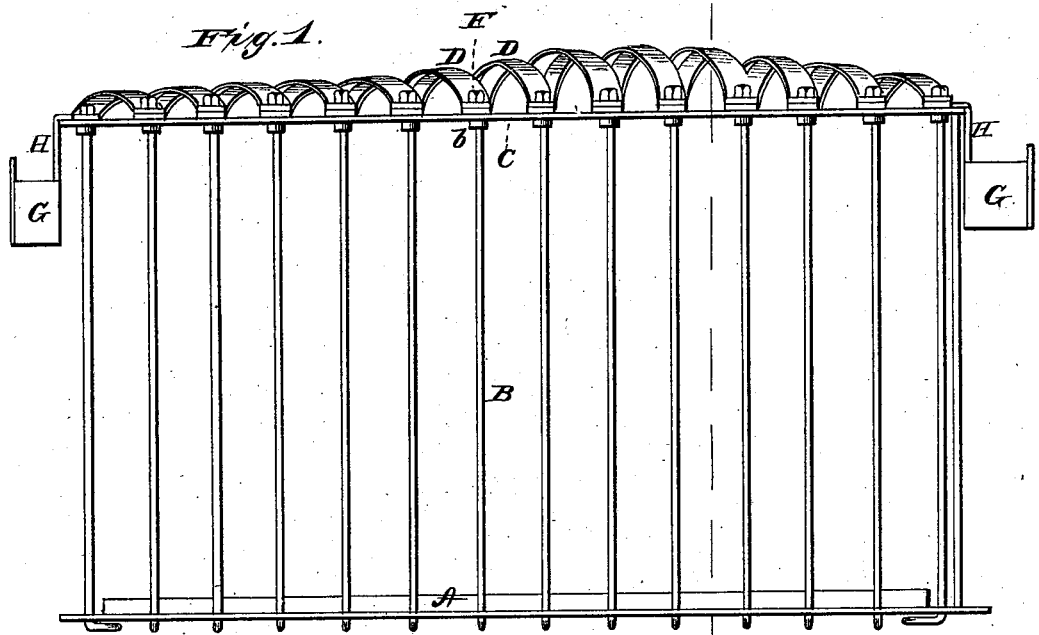
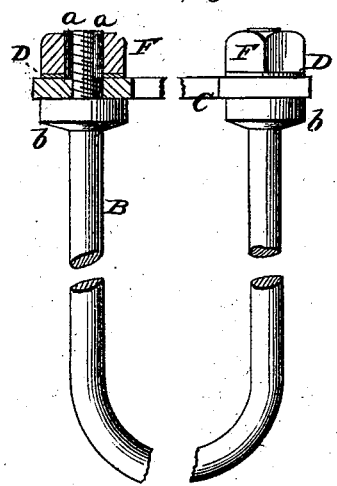
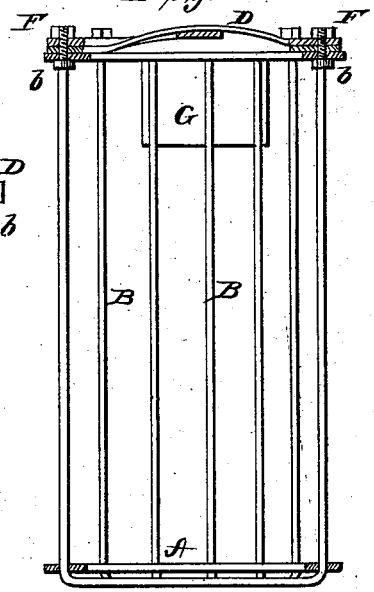
WITNESSES
INVENTOR
Solomon S. Smick
By Alexander Mason
Attorneys

UNITED STATES PATENT OFFICE.

SOLOMON S. SMICK, OF FORT WAYNE, INDIANA.

IMPROVEMENT IN GRAVE-SHIELD AND BODY-PROTECTOR.

Specification forming part of Letters Patent No. 209,932, dated November 12, 1878; application filed October 31, 1878.

*To all whom it may concern:*

Be it known that I, SOLOMON S. SMICK, of Fort Wayne, in the county of Allen, and in the State of Indiana, have invented certain new and useful Improvements in Grave-Shield and Body-Protector; and do hereby declare that the following is a full, clear, and exact description thereof, reference being had to the accompanying drawings, and to the letters of reference marked thereon, making a part of this specification.

The nature of my invention consists in the construction and arrangement of a device which I term a "grave-shield and body-protector," and which has for its object to prevent grave-robbing, and also to beautify and protect the grave as originally rounded up or finished, as will be hereinafter more fully set forth.

In order to enable others skilled in the art to which my invention appertains to make and use the same, I will now proceed to describe its construction and operation, referring to the annexed drawing, in which—

Figure 1 is a side elevation of my invention. Fig. 2 is a transverse vertical section of the same. Fig. 3 is an enlarged sectional view of one of the fastening-bolts.

A represents a bed-plate, of any suitable form and dimensions, under which and up through both of its sides and ends are passed a series of continuous protecting-rods, B B, at equal distances apart. The center of each rod B passes crosswise under the bed-plate A, and the arms or ends of the rod extend vertically upward through holes in the bed-plate, said bed-plate forming a resting-place for a rough box or coffin.

The protecting-rods B are to extend upward as high as the level of the ground or top of the ground, where they pass through a top or surface plate, C, which plate rests upon collars or shoulders $b\, b$, formed near the upper ends of the rods B.

After the body has been deposited in the cage thus formed and let down in the grave and properly covered up with soil, the top of the apparatus is closed up by means of round or flat pieces D D of iron, crossing each other, as shown. These inclosing rods or straps D are to be made in oval form, corresponding to the shape given to the top of the grave. The parts are then secured together by nuts F, screwed down tightly on the upper projecting ends of the rods B.

At each end, however, is first attached a box or receiver, G, suspended by means of straps H H, to receive the tombstones, and in which they can be easily and permanently adjusted.

The nuts F are locked by means of wedge-shaped keys $a\, a$, driven downward in holes formed one half in the bolt and the other half in the nut, as shown in Fig. 3.

This apparatus may be made of either iron or steel, and the continuous bottom and upright protecting-rods B should be placed from four to eight inches apart, but should be sufficiently close to prevent the use of any kind of an implement between them by which the body could be disturbed.

This device not only protects the remains, so that they can at any time be easily found and gathered together for the purpose of removal and reburial, but it is also a lasting mark of the final resting-place of the body, and the grave can be beautified to any degree desired by setting out or planting flowers in the space between the finishing cross-strips D.

The nuts cannot be wrenched off without bursting them, the wedges $a\, a$ being driven in perfectly tight after the nut is to its place. There is no room at any point to drive out or in any way loosen these wedges or to cut them with a chisel.

Having thus fully described my invention, what I claim as new, and desire to secure by Letters Patent, is—

1. A grave-shield or body-protector consisting of a bed-plate, side and end rods, and top strips, all connected together in a permanent manner, substantially as herein set forth.

2. The combination of the bed-plate A, continuous protecting-rods B, top plate, C, strips D, and nuts F, substantially as and for the purposes herein set forth.

In testimony that I claim the foregoing I have hereunto set my hand this 6th day of March, 1878.

SOLOMON S. SMICK.

Witnesses:
J. M. BELL,
J. M. MASON.